C. VANDERBEEK.
COFFEE-POT.

No. 178,091. Patented May 30, 1876.

WITNESSES:
Chas. Niota
John Goethals

INVENTOR:
C. Vanderbeek
BY
ATTORNEYS.

UNITED STATES PATENT OFFICE.

CHRISTIAN VANDERBEEK, OF ROCK FALLS, ILLINOIS.

IMPROVEMENT IN COFFEE-POTS.

Specification forming part of Letters Patent No. 178,091, dated May 30, 1876; application filed March 25, 1876.

*To all whom it may concern:*

Figure 1:
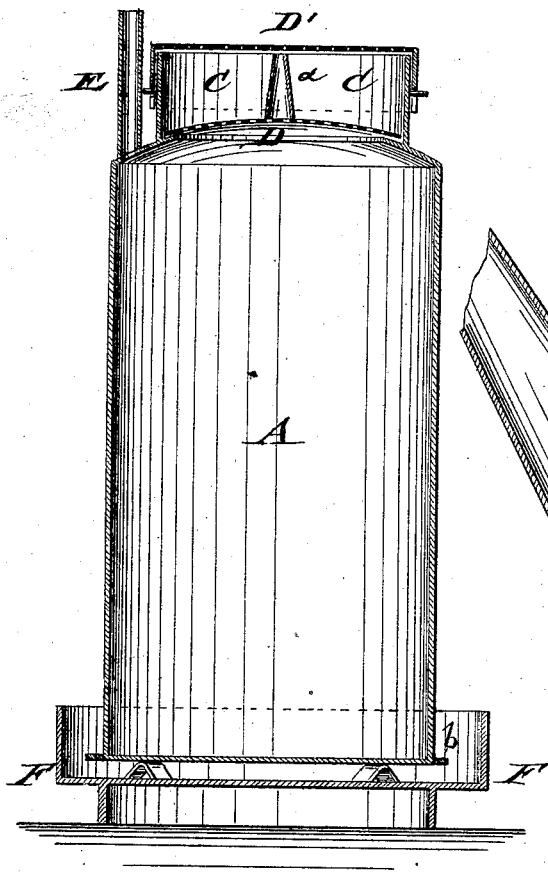
Figure 2:
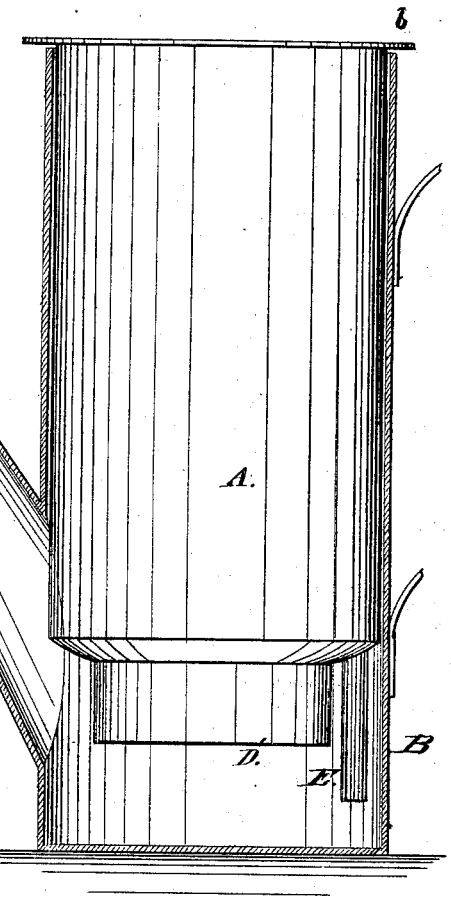

Be it known that I, CHRISTIAN VANDERBEEK, of Rock Falls, in the county of Whitesides and State of Illinois, have invented a new and Improved Coffee-Machine, of which the following is a specification:

In the accompanying drawing, Figure 1 represents a vertical central section of the interior cylinder of my improved coffee-machine, (shown in position for heating the water;) and Fig. 2 is a vertical central section of the machine, showing the interior part inserted into the outer pot.

Similar letters of reference indicate corresponding parts.

My invention is an improvement in the class of coffee pots or machines composed of two parts or receptacles, and adapted to be connected in such manner that the ground coffee will be subjected to the action of hot water as it passes from one pot or receptacle into the other.

The invention relates particularly to providing the inner cylinder or receptacle with strainers of different degrees of fineness, as hereinafter described.

In the drawing, A represents the interior cylinder or receptacle, and B a coffee-pot of corresponding shape, that may be readily placed over the interior cylinder. The cylinder A is supplied with as much water as required, and the ground coffee is placed into a straining-receptacle, C, at the top of the cylinder. The straining-receptacle C is made of a coarse lower strainer, D, placed on a supporting-flange of the cylinder, and of an upper finer strainer, D', that is locked by means of recesses or grooves on pins or buttons at the upper part of the cylinder. The lower strainer D is inclosed by the upper, and provided with a central rod or support, a, extending to the top strainer, so that when the cylinder is turned upside down the relative position of the strainers on the same is not changed. A small steam-pipe, E, at the top of the cylinder A indicates when the water in the cylinder is boiling. The water in the cylinder may be heated by placing the cylinder on a common alcohol-stand, F, or on a stove—gas or otherwise.

When the water is boiling the coffee-pot is turned over, slipped bottom-side up over the cylinder, and pushed down until the top of the coffee-pot comes in contact with the bottom rim or flange of the cylinder. The coffee-pot is then turned back again with the cylinder, which brings the straining-receptacle into the lower part of the pot, and causes the boiling water to run through the ground coffee, that has already been moistened and prepared by the steam of the boiling water.

The grounds are retained by the strainers, without mixing with the coffee that is poured out, in the usual manner, producing thereby a coffee containing all the strength and aroma of the beans.

Having thus described my invention, what I claim as new, and desire to secure by Letters Patent, is—

The combination, with the cylinder A, of a lower coarser strainer, having central pillar or support, with a finer top or inclosing strainer, for the purpose set forth.

CHRISTIAN VANDERBEEK.

Witnesses:
HENRY L. DAVIS,
PETER I. WHITNEY.